United States Patent [19]

van Ballegooijen et al.

[11] 4,396,749

[45] Aug. 2, 1983

[54] PREPARATION OF COMPOSITE POLYMERS CONTAINING ACTIVE HYDROGEN ATOMS

[75] Inventors: Hendrik van Ballegooijen; John C. Chadwick, both of Amsterdam, Netherlands

[73] Assignee: Shell Oil Company, Houston, Tex.

[21] Appl. No.: 355,083

[22] Filed: Mar. 5, 1982

[30] Foreign Application Priority Data

Apr. 29, 1981 [GB] United Kingdom ................ 8113182

[51] Int. Cl.³ ............................................. C08L 25/00
[52] U.S. Cl. .................................... 526/209; 525/404; 525/440; 525/455
[58] Field of Search ................ 526/209; 525/404, 440, 525/455

[56] References Cited

U.S. PATENT DOCUMENTS

| | | | |
|---|---|---|---|
| 3,257,476 | 6/1966 | Tobolsky et al. | 260/859 |
| 3,291,859 | 12/1966 | Tobolsky | 260/859 |
| 3,865,898 | 2/1975 | Tobolsky | 525/455 |
| 4,104,236 | 8/1978 | Simroth | 260/33.2 R |
| 4,210,727 | 7/1980 | Preston et al. | 521/137 |
| 4,272,619 | 6/1981 | Balle et al. | 526/209 |
| 4,317,895 | 3/1982 | Guagliardo et al. | 525/455 |

*Primary Examiner*—Maurice J. Welsh
*Attorney, Agent, or Firm*—Norris E. Faringer

[57] ABSTRACT

Composite polymers, especially composite polyols containing active hydrogen atoms can be prepared by polymerizing one or more olefinically unsaturated compounds in the presence of a liquid polymer containing active hydrogen atoms and a modified initiator; the modification comprising the reaction between a liquid polymer containing one or more groups which can react with isocyanato groups and a compound containing two or more isocyanato groups which has been partially converted by reacting it with an organic hydroperoxide or a free-radical initiator also containing additional active hydrogen atoms. The composite polymers exhibit a stable dispersed polymer phase and can be suitably applied as starting materials for polyurethane foams.

11 Claims, No Drawings

PREPARATION OF COMPOSITE POLYMERS CONTAINING ACTIVE HYDROGEN ATOMS

FIELD OF THE INVENTION

The present invention relates to a process for the preparation of composite polymers, especially composite polyols containing active hydrogen atoms.

BACKGROUND OF THE INVENTION

Composite polymers containing active hydrogen atoms, and in particular, composite polyols are of importance in that they can be used as starting materials in many chemical reactions. Composite polyols, for example, are valuable starting materials in the preparation of polyurethanes. Composite polyols also referred to in the art as polymer/polyols (J. of Cellular Plastics, March 1966, pp. 84–96) are valuable starting materials for products which will impart superior properties to urethane foams, in particular flexible foams. They are usually prepared by the in situ polymerization of a vinyl monomer in polyol base to give a dispersion of the vinyl polymeric portion in the liquid polyol. It is believed that the stability of the dispersion obtained is dependent on the specific monomer applied.

It is known from U.S. Pat. No. 4,104,236 that polymer/polyols can be prepared by polymerizing acrylonitrile or acrylonitrile/styrene mixtures in the presence of a polyoxypropylene polyol having a molecular weight of at least 1500. The polymerization is carried out using 2,2-azobisisobutyronitrile as the free-radical initiator. According to the disclosures in U.S. Pat. No. 4,210,727 polyol/graft polymer compositions can be obtained by polymerizing ethylenically unsaturated compounds (acrylonitrile or acrylonitrile/styrene mixtures) with a polyol in the presence of very specific peroxydicarboxylic acid-di-(polyol)esters as free-radical initiators. A disadvantage is, of course, that the radical initiators are not readily available and have to be prepared via a number of process steps in a rather cumbersome way.

Therefore, it would be of great interest to develop a process for the preparation of composite polyols which will lead to polyurethane foams which have improved load bearing properties, preferably with (near) retention of elasticity as measured by elongation at break and without increase in density, from easily accessible starting materials. In order to comply with the performance parameters as discussed hereinabove, the composite polyol should contain a blend of block copolymers and, optionally, homopolymers with polyol in the form of a fine dispersion giving the composite polyol good homogeneity and stability as well as an acceptable viscosity.

SUMMARY OF THE INVENTION

It has now been found that such composite polyols can be prepared when the polymerization reaction is carried out in the presence of a modified initiator. The composite polyols prepared according to the present invention can be used with good results in the preparation of flexible polyurethane foams with the required performance parameters. Moreover, a further advantage of the composite polyols prepared according to the present invention comprises a reduced tendency to scorch discoloration in foam formulations containing high water levels compared with known acrylonitrile-based polymer/polyol.

DESCRIPTION OF THE PREFERRED EMBODIMENTS

The present invention preferably is directed to a process for the preparation of composite polymers containing active hydrogen atoms capable of reaction with isocyanato groups which comprises polymerizing one or more olefinically unsaturated compounds in the presence of a liquid polymer containing active hydrogen atoms and a modified initiator, said modification comprising the reaction between a liquid polymer containing one or more groups which can react with isocyanato groups and a compound containing two or more isocyanato groups which has been partially converted by reacting it with an organic hydroperoxide or a free-radical initiator also containing additional active hydrogen atoms.

The present invention more preferably relates to a process for the preparation of composite polyols by polymerizing one or more olefinically unsaturated compounds in the presence of a liquid polyol and a modified initiator, said modification comprising the reaction between a liquid polymer containing one or more groups which can react with isocyanato groups, in particular a liquid polyol, and a compound containing two or more isocyanato groups which has been partially converted by reacting it with an organic hydroperoxide.

For the sake of completeness it should be noted that the use of peroxycarbamate-type initiators in free-radical polymerization reactions has been suggested in the art (e.g. U.S. Pat. Nos. 3,257,476 and 3,291,859). However, according to the disclosures of the abovementioned patent specifications, block copolymers are produced by radical polymerization of a large excess of a monomer wherein a polyether or polyester prepolymer is dissolved, made by reacting an excess of a diisocyanate and a hydroxy polyether or polyester. Consequently polymer matrices are formed consisting predominantly of the appropriate polymer and therein minor parts of the polyether or polyester prepolymer.

Olefinically unsaturated compounds which can be suitably used in the process for the preparation of composite polymers according to the present invention comprise those having at least one unsaturated carbon-carbon bond in the molecule. Examples of suitable monomers comprise aliphatic diolefins such as butadiene and isoprene; styrene and substituted styrenes such as alpha-methylstyrene, the halostyrenes, cyanostyrene and nitrostyrene; acrylic acid and substituted acrylic acids such as acrylonitrile, methacrylic acid, esters of (meth)acrylic acid such as methylacrylate, hydroxyethylacrylate, methylmethacrylate, methacrylonitrile, phenylmethacrylate, N,N-dimethylacrylamide and methacrylformamide; vinyl compounds such as the vinyl esters vinylacetate, vinylacrylate and vinylbenzoate, the vinylethers such as vinylmethylether, vinyl 2-ethylhexylether, vinylphenylether and methoxybutadiene; vinylhalides such as vinylfluoride, vinylchloride, vinylbromide and vinyliodide; vinylketones such as vinylmethylketone and vinylethylketone and heterocyclic vinyl compounds such as 2-vinylpyridine and 4-vinylpyridine. Preference is given to the use of styrene, acrylonitrile, methylmethacrylate and 4-vinylpyridine. Most preference is given to the use of styrene. Also mixtures of olefinically unsaturated compounds can be suitably used.

The olefinically unsaturated compounds are polymerized in the presence of a liquid polymer containing active hydrogen atoms. Examples of classes of liquid polymers containing active hydrogen atoms are liquid polyethers, polyesters and polydiolefins containing one or more hydroxyl-, amino-, hydrocarbyl-amino- or carboxyl groups. Good results have been obtained using liquid polymers having hydroxyl groups as the active hydrogen-containing groups in the molecule, but liquid polymers containing other functional groups or having different functional groups can also be applied.

Examples of liquid polyethers containing functional groups are liquid polyols, liquid polyamines and liquid polycarboxylates. The polyols to be used in the process according to the present invention as such or in admixture with other liquid polymers comprise the following classes: polyether polyols; polyester polyols; polyether polyester polyols; polyesteramide polyols or condensation products of amines or alkanolamines with an alkylene oxide. Examples of polyols are, for example, alkylene oxide adducts of polyhydroxyalkanes, the alkylene oxide adducts of non-reducing sugars and derivatives thereof, alkylene oxide adducts of phosphoric acid, polyphosphoric acid or polyphenols and polyols of natural oils such as ricin oil.

A preferred class of liquid polyols comprises alkylene oxide adducts of polyhydroxyalkanes such as ethylene glycol, propylene glycol, 1,3-dihydroxypropane, 1,3-dihydroxybutane, 1,4-dihydroxybutane, glycerol, 1,1,1-trimethylol propane, and pentaerythritol, most preference being given to ethylene oxide-, propylene oxide-, styrene oxide- or epichlorohydrin adducts of trihydroxyalkanes or mixtures of two or more of such compounds.

Examples of alkylene oxide adducts of non-reducing sugars comprise alkylene oxide adducts of sucrose, wherein the alkylene oxide moiety has 2–4 carbon atoms. Examples of polyphenols and preferably of alkylene oxide adducts thereof comprise bisphenol A, bisphenol F, condensation products of phenol and formaldehyde, novolac resins and condensation products of various phenolic compounds such as 1,1,3-tris(hydroxyphenyl) propane and acrolein.

Also, polyols which have been prepared by reacting one or more of the above-mentioned polyols with less than the stoichiometric amount of organic (poly)isocyanate can be suitably applied as the liquid polymer in the process according to the present invention.

Suitably the liquid polyols to be used have an average molecular weight in the range of from 500 to 10,000, preference being given to the use of liquid polyols having an average molecular weight in the range of from 2000 to 6000. Good results have been obtained using poly(oxypropylene co-oxyethylene)-triols having an average molecular weight between 3000 and 5000.

Normally the polymerization is carried out in such a way that the final composite polymer contains an amount of polymer in the range of from 1%w to 40%w, preferably in the range of from 5%w to 30%w, calculated on the total weight of composite polymer. It has been found that very good composite polyols can be obtained, showing a stable dispersed polymer phase when the amount of polymer present in the continuous polyol phase is in the range of from 10–25%w, preferably about 20%w or slightly below, calculated on the total weight of the composite polyol.

In order to prepare the composite polymers use is made of a modified initiator system. The modified initiator system is based on the reaction product of a liquid polymer as defined hereinbefore and a compound containing two or more isocyanato groups which has been partially converted by reacting it with an organic hydroperoxide or a free-radical initiator also containing additional active hydrogen atoms. It is the object of the present invention that the polymerization of the olefinically unsaturated compound is carried out in the presence of a liquid polymer containing sufficient active hydrogen atoms in order to ensure that the number of free isocyanato groups originally present in the reaction mixture is less than the number of active hydrogen atoms originally present therein.

Normally, the modified initiator system will be obtained by first reacting a compound containing at least two isocyanate groups with an organic hydroperoxide or a free-radical initiator having additional active hydrogen atoms, in such a way that only part of the isocyanato groups originally present are converted into peroxycarbamate linkages. Good results can be obtained by converting at least 20% of the isocyanato groups originally present. Preference is given to conversions in the range of from 40% to 60% of the isocyanato groups originally present.

Suitable compounds containing two or more isocyanato groups in the molecule comprise organic di- and polyisocyanates including monoarylpolyisocyanates and polyaryl isocyanates, such as polyaryl polyalkylene polyisocyanates. Examples of monoaryl polyisocyanates are toluene-2,4-diisocyanate and toluene-2,6-diisocyanate as well as mixtures thereof such as 80/20 and 65/35 weight ratio mixtures, m-phenylene diisocyanate and p-phenylene diisocyanate. Examples of polyaryl polyisocyanates are naphthalene-1,5-diisocyanate, diphenylmethyl-4,4'-diisocyanate, 3-methyldiphenylmethane-4,4'-diisocyanate and diphenyl-4,4'-diisocyanate. Also aliphatic diisocyanates such as pentamethylene diisocyanate and hexamethylene diisocyanate can be used suitably as well as mixtures of aliphatic and/or aromatic di- and/or polyisocyanates. The organic di- and polyisocyanates can be prepared by methods known in the art, e.g. by reaction of aromatic amines with formaldehyde and hydrochloric acid. Crude diisocyanates prepared by such methods normally contain polyisocyanates as well. Such products can be used without any further treatment. Normally crude diphenylmethane diisocyanates comprise about 30 to 90%w, preferably 40 to 65%w of polyisocyanate having a functionality greater than 2.

Suitable organic hydroperoxides which can be used in the process according to the present invention comprise aliphatic hydroperoxides such as t-butyl hydroperoxide, 2,4,4-trimethylpentylhydroperoxide, p-methane hydroperoxide, pinane hydroperoxide and 2,5-dimethylhexane-2,5-dihydroperoxide and aromatic hydroperoxides such as cumene hydroperoxide, tetral in hydroperoxide, phenylcyclohexane hydroperoxide and diisopropylbenzene hydroperoxide. Good results have been obtained using 2,5-dimethylhexane-2,5-dihydroperoxide or 2,4,4-trimethylpentyl hydroperoxide as the free-radical initiator.

Examples of free-radical initiators containing additional active hydrogen atoms, i.e. compounds which, having been reacted with a compound containing two or more isocyanato groups, still contain active groups in the molecule, comprise azo compounds containing groups having one or more active hydrogen atoms (e.g. carboxylic groups) as well as peroxides having additional active hydrogen atoms such as the alkyl hydroxyalkyl peroxides, e.g. t-butyl hydroxymethyl peroxide, methylethylketone peroxide, succinic acid peroxide, glutamic acid peroxide and hydroxyl or amino group-containing di- and polysulphides.

It will be clear that the reaction between the compound containing two or more isocyanato groups in the molecule and the organic hydroperoxide or another free-radical initiator takes place at a rather low temperature. Temperatures at ambient or below can be used successfully, preference being given to temperatures in the range between −10° C. and +10° C. Normally the reaction is carried out in the presence of a basic catalyst such as a tertiary amine. Good results have been obtained using a small amount of triethylamine as the catalyst. If desired, the formation of the peroxycarbamate linkage can be carried out in the presence of all or part of the monomer(s) to be polymerized using the final catalytic system insofar as the rate of polymerization is sufficiently lower than the rate of formation of the peroxycarbamate linkage.

As discussed hereinbefore the final modified initiator can be obtained by reacting the product of the reaction between a compound containing two or more isocyanato groups and an organic hydroperoxide or another free-radical initiator having additional active hydrogen atoms with a liquid polymer containing one or more groups which can react with isocyanato groups. Care should be taken to ensure that in the reaction mixture the number of isocyanato groups present is always less than the number of active hydrogen atoms present. Normally, this will be achieved by using an excess of the liquid polymer as defined hereinbefore. A two to twenty fold molar excess of the liquid polymer can be suitably used, preference being given to a two to six fold excess of the liquid polymer. In the event that the liquid polymer is the same as the liquid polymer which serves as the continuous phase for the polymerization reaction, even larger amounts of that liquid polymer can be applied advantageously. Especially liquid polyols as described hereinbefore can be used advantageously in the preparation of the modified initiator.

The final step in the preparation of the modified initiator is normally carried out at a slightly higher temperature than the earlier step. Temperatures of up to 100° C., or even up to 150° C. can be applied; the optimal temperature depending on the type of reagent applied. Again, the use of a basic catalyst such as a tertiary amine, e.g. trimethylamine or triethylamine, is highly recommended. Catalyst concentrations in the range of from 0.01%w–5%w can be suitably applied, preference being given ot concentrations in the range of from 0.03%w–2%w.

It is also possible to prepare the modified initiator in the initial presence of both the monomer to be polymerized and the liquid polymer which will serve as the continuous phase for the polymer produced when the various reaction rates are sufficiently different to allow the desired sequence of the various reactions contemplated.

The polymerization of the olefinically unsaturated compound in the presence of the liquid polymer using the modified initiator is normally carried out at a temperature between 60° C. and 160° C. depending on the specific modified initiator applied. Using an initiator based on 2,4,4-trimethylpentyl hydroperoxide, reaction temperatures between 70° C. and 120° C. have been found to be adequate. It is also possible to carry out the polymerization in two or more states, e.g. firstly be carrying out the polymerization at a temperature of about 75° C. up to 30% monomer conversion and then raising the temperature to about 105° C.

The composite polyols prepared according to the process of the present invention can be used to prepare various types of polyurethane foams. Suitably, they can be used for the production of cellular or non-cellular polyurethanes in accordance with the general methods described in the literature. For instance, they can be reacted, possibly admixed with other active hydrogen atom-containing compounds, with organic di- and/or polyisocyanates, if desired in the presence of other substances, such as foaming agents, surface-active agents, flame-retarding agents and other additives known in the art.

It should be noted that the process according to the present invention is also advantageous in that it can be operated using an unsaturated hydrocarbon, especially styrene, as the only compound to be polymerized. Thus far prior art processes have been based on the polymerization of styrene in the presence of a large amount of another polymerizable monomer, normally acrylonitrile.

In accordance with the above, the present invention also relates to composite polymers, especially composite polyols manufactured by the process according to the present invention, the production of polyurethanes by reacting said composite polyols with isocyanates, and polyurethanes so produced.

The invention is illustrated by the following examples. In the examples, parts and percentages are by weight unless otherwise stated. It is understood that the examples are embodiments only and are given for the purpose of illustration only and the invention is not to be regarded as limited to any specific components and/or specific conditions recited therein.

EXAMPLE I

A mixture of 5.9 grams of toluene diisocyanate (2,4-/2,6-isomer ratio 80:20) and 2,5-dimethyl-2,5-bis(hydroperoxy)hexane in a molar ratio of 2.2 was reacted in the presence of 0.3%w of triethylamine on toluene diisocyanate in 18 mls tetrahydrofuran at 0° C. during 5 minutes. Thereafter, the mixture obtained was added to 360 grams of liquid poly(oxypropylene-co-ethylene)-triol having an average number molecular weight of 4500 and having more than 80% primary hydroxyl groups and the resulting mixture was kept at 25° C. during 16 hours in the presence of triethylamine (0.1%w on triol intake). Thereafter, the polymerization of styrene was carried out batchwise at 140° C. during 12 hours in a 0.5 l glass bottle fitted with a serum capl the initial charge being 20%w styrene and 80%w of the modified polyol as described in this example. After completing the polymerization, unreacted styrene was removed from the product by stripping with nitrogen under reduced pressure. Using a styrene/modified initiator molar ratio of 56, 14.7%w of polystyrene was found to be present in the final composite polyol and using a molar ratio of 112 gave 12.4%w of polystyrene in the final composite polyol.

EXAMPLE II

The experiments described in Example I were repeated but using cumene hydroperoxide as the free-radical initiator in a toluene diisocyanate/cumene hydroperoxide ratio of 1.1 under otherwise similar conditions. Using a styrene/modified initiator molar ratio of 56, 13.6%w of polystyrene was found to be present in the final composite polyol and using a molar ratio of 112 gave 13.2%w of polystyrene in the final composite polyol.

EXAMPLE III

The experiments described in Example I were repeated but using a different liquid polymer: a poly(oxypropylene-co-ethylene)-triol having an average number molecular weight of about 3500 and having at least 95% secondary hydroxyl groups. Using a styrene/modified initiator molar ratio of 56, 13.9%w of polystyrene was found to be present in the final composite polyol and using a molar ratio of 112, gave 12.7%w of polystyrene in the final composite polyol.

EXAMPLE IV

The experiments described in Example II were repeated but using a different liquid polymer: a poly(oxypropylene-co-ethylene)-triol having an average number molecular weight of about 3500. Using a styrene/modified initiator molar ratio of 56, 18.5%w of polystyrene was found to be present in the final composite polyol and using a molar ratio of 112, gave 17.2%w of polystyrene in the final composite polyol.

EXAMPLE V

The dispersion stability of the composite polyols prepared according to the methods described in the Examples I-IV was measured by the following method. The composite polyol to be tested is diluted with the initial liquid polyol to a polystyrene content of 2%w and the resulting blend stirred until a homogeneous dispersion is obtained before being centrifuged for a period of 4 hours. The upper layer is then decanted, the remaining solid dispersed in methanol, and centrifugation is repeated for 30 minutes. After washing and centrifuging, the sediment is dried at 60° C. under reduced pressure. Taking this material to be essentially homopolystyrene, dispersion stability is given as the fraction of polystyrene remaining in dispersion, expressed in percentage. The results are given in Table I for composite polyols prepared using a styrene/modified initiator molar ratio of 112.

TABLE I

| Composite polyol described in Example | Dispersion stability, % |
| --- | --- |
| I | 97 |
| II | 87 |
| III | 97 |
| IV | 93 |
| * | 78 |

*a similar blend based on Niax polymer polyol ex Union Carbide (acrylonitrile/styrene) was tested for comparison.

EXAMPLE VI

The effects of the composite polyols prepared according to the process according to the present invention were screened by the preparation of squashed foams. The squashed foam technique (J. Cell. Plastics, 10, 1974, 3) allows the separation of the effects of polymer variables from those of the foam (cell) structure by compressing the polyurethane foam to a solid sheet before full cure. The various squashed foams were prepared using formulations as described in Example III (1, 2) and IV (3, 4) based on 100 pbw of the composite polyol, 0.2 pbw of tin (II) octanoate, 0.3 pbw of dimethylaminoethanol, 3 pbw of toluene diisocyanate. The press temperature applied was 150° C. at a press pressure of 50 bar. Some of the properties of the polyurethanes obtained (i.e. hardness (shore D, after 30S), tensile strength (MPa) and elongation at break (%) are given in Table II. The various properties have been measured using standard test methods. For comparative purposes, these properties have also been measured for polyurethanes based on the liquid polyol used in the preparation of the composite polyols (indicated in the table as A) and for polyurethanes based on Niax polymer polyol (ex Union Carbide) referred to in the previous Example (indicated in the Table as B). It will be clear from the data given in Table II that the composite polyols prepared according to the process according to the present invention compare favourably with polyurethanes not having been prepared using modified initiators.

TABLE II

| (Polyol) composition | Hardness | Polyurethane properties Tensile strength | Elongation break |
| --- | --- | --- | --- |
| 1 | 40.2 | 14.4 | 223 |
| 2 | 42.8 | 14.1 | 220 |
| 3 | 39.6 | 14.8 | 246 |
| 4 | 41.2 | 13.8 | 227 |
| A | 33.2 | 10.2 | 192 |
| B | 36.5 | 13.6 | 205 |

EXAMPLE VII

An experiment was carried out to demonstrate that the composite polyols can be prepared in the initial presence of both the liquid polymer and the olefinically unsaturated compound because of the high rate of the base-catalyzed reaction of the compound containing two or more isocyanate groups and the organic hydroperoxide (or another free-radical initiator containing additional active hydrogen atoms). Thus 2,4,4-trimethylpentyl-2-hydroperoxide was added to a mixture of the polyol having an average number molecular weight of 4500 as used in Example I, styrene and 4,4'-diisocyanatodiphenylmethane in such a way that the molar ratio diisocyanate/hydroperoxide amounted to 1.1, ensuring an amount of 60 mmol hydroperoxide per kg of polyol and an initial styrene concentration of 20%w. The reaction was carried out using 0.1%w of triethylamine on polyol as catalyst. The temperature of the reaction was brought to 100° C. during 2 hours and the reaction mixture was then heated to 130° C. and kept at this temperature during several hours. The styrene conversion amounted to 80.2%, a composite polyol was obtained having properties similar to those found for the polyols described in the preceding Examples.

EXAMPLE VIII

Some experiments were carried out to demonstrate the effect of initiator concentration and isocyanate/hydroperoxide molar ratio on the viscosity of the desired product. The viscosity of composite polyols is an important factor since the maximum allowable viscosity of both the composite polyol and the resulting blend is limited by the capacity of the pumping equipment used. The experiments were carried out as described in Example VII. The process conditions as well as the viscosity of composite polyol products diluted to 10%w of polystyrene on total composite polyol are summarized in Table III. It will be clear from the data given in Table III that the viscosity of the product composite polyol can be influenced by variations in the process parameters. It appears that the viscosity decreases with both decreasing initiator concentration and decreasing isocyanate/hydroperoxide ratio. It should be noted that significant reduction in product viscosity can be obtained without any substantial deterioration in the dispersion properties such as the particle size.

TABLE III

| Process conditions | | | | Viscosity |
|---|---|---|---|---|
| hydroperoxide conc., (mmol/kg polyol) | Isocyanate/ hydroperoxide molar ratio | Total poly. time, hrs. | Styrene conversion, % | of 10% w product (cP, 25° C.)* |
| 60 | 1.1 | 5 | 92 | 2124 |
| 60 | 1.0 | 5 | 92 | 1984 |
| 60 | 0.9 | 5 | 90 | 1870 |
| 50 | 1.1 | 5.5 | 93 | 1879 |
| 50 | 1.0 | 5.5 | 92 | 1790 |
| 50 | 0.9 | 5.5 | 92 | 1680 |
| 40 | 1.1 | 6.5 | 93 | 1693 |
| 40 | 1.0 | 6.5 | 93 | 1600 |
| 40 | 0.9 | 6.5 | 92 | 1554 |

*viscosity of liquid polyol alone: 866 cP

EXAMPLE IX

Some experiments were carried out on a kmol scale using the methods as described in Example I. The process was started by gradually adding 2,4,4-trimethyl-pentyl-2-hydroperoxide to a stirred cooled solution of 4,4'-diisocyanatodiphenylmethane in styrene also containing triethylamine, resulting in a temperature rise from about 5° C. to 15° C. The relative proportions by weight of reactants used were hydroperoxide:isocyanate: styrene:triethylamine = 1:1.9:12:0.02. Following the transfer of this solution and additional styrene and triethylamine to a reactor already containing the liquid polyol described in Example III in such an amount that the styrene concentration amounted to 20%w on total mixture, the temperature was raised gradually in about 2 hours from 20° C. to 100° C. and up to 130° C. in a further 2 hours and kept at this temperature for another 4 hours. Thereafter unreacted styrene was flashed off at 130° C. at reduced pressure over a period of 1 hour. The polystyrene content of the final composite polyol amounted to 19.5%w and the residual styrene monomer content after nitrogen stripping amounted to 38 ppm. The particle size distribution of the final composite polyol was <0.5–1.5 m. The product thus prepared can be suitably used for machine trials for various polyurethane flexible foam applications.

EXAMPLE X (a) The composite polyol prepared according to the experiments described in the previous Example was used in a conventional process for the preparation of polyurethane slabstock foam. An approximately 20% increase in hardness (load bearing property) was obtained from composite polyols diluted to 10%w of polystyrene. Also the hardness/elongation balance ran parallel with that obtained using a polymer polyol (Niax, diluted to 10%w acrylonitrile/styrene). Good processing was obtained with no deterioration in cell structure.

It was found that styrene-based composite polyols had a definite advantage over acrylonitrile/styrene-based polymer polyols in that a reduced tendency to scorch discoloration was seen in foam formulations containing high water levels.

(b) Some foams were made using the liquid polyol described in Example I as the liquid polymer. It was found that good processing could be obtained both with respect to high resilience slabstock and to cold-cure and especially hot-cure molding.

We claim:

1. A process for the preparation of composite polymers containing active hydrogen atoms capable of reaction with isocyanato groups comprising polymerizing one or more olefinically unsaturated compounds in the presence of an initiator system, the improvement which comprises using as an initiator system the reaction product of a liquid polymer containing one or more groups which can react with isocyanato groups and a peroxycarbamate containing isocyanato groups, said peroxycarbamate having been prepared by the reaction of an excess of a compound containing at least two isocyanato groups with an organic hydroperoxide or a free-radical initiator having additional active hydrogen atoms.

2. The process of claim 1 wherein the liquid polymer is a liquid polyol.

3. The process of claim 1 wherein the free-radical initiator is an organic hydroperoxide.

4. The process of claim 3 wherein the organic hydroperoxide is an aliphatic hydroperoxide.

5. The process of claim 4 wherein the aliphatic hydroperoxide is 2,5-dimethyl-hexane-2,5-dihydroperoxide or 2,4,4-trimethylpentyl-hydroperoxide.

6. The process of claim 1 wherein as olefinically unsaturated compound is selected from the group consisting of styrene, acrylonitrile, methylmethacrylate, 4-vinylpyridine and mixtures thereof.

7. The process of claim 1 wherein the olefinically unsaturated compounds are polymerized in the presence of liquid polyethers, polyesters or polydiolefins containing one or more hydroxyl-, amino-, hydrocarbylamino-, or carboxyl groups.

8. The process of claim 4 wherein the olefinically unsaturated compounds are polymerized in the presence of an alkylene oxide adduct of a polyhydroxyalkane having an average number molecular weight of from 500 to 10,000.

9. The process of claim 1 wherein the polymerization is carried out in such a way that the final composite polymer contains an amount of polymer in the range of from about 1%w to 40%w calculated on the total weight of composite polymer.

10. The process of claim 1 wherein up to about 80% of the isocyanato groups originally present is converted into peroxycarbamate linkages.

11. The process of claim 1 wherein the polymerization is carried out at a temperature between about 60° C. and 160° C.

* * * * *